US012568496B2

(12) United States Patent
Kuo et al.

(10) Patent No.: US 12,568,496 B2
(45) Date of Patent: Mar. 3, 2026

(54) USER EQUIPMENT AND BASE STATION FOR MANAGING REPETITION-BASED UPLINK GRANTS IN NR

(71) Applicant: NOKIA TECHNOLOGIES OY, Espoo (FI)

(72) Inventors: Ping-Heng Kuo, London Greater London (GB); Zexian Li, Espoo (FI); Matha Deghel, Paris (FR)

(73) Assignee: Nokia Technologies Oy, Espoo (FI)

( * ) Notice: Subject to any disclaimer, the term of this patent is extended or adjusted under 35 U.S.C. 154(b) by 694 days.

(21) Appl. No.: 17/921,472

(22) PCT Filed: Apr. 23, 2021

(86) PCT No.: PCT/IB2021/053383
§ 371 (c)(1),
(2) Date: Oct. 26, 2022

(87) PCT Pub. No.: WO2021/220121
PCT Pub. Date: Nov. 4, 2021

(65) Prior Publication Data
US 2023/0209554 A1     Jun. 29, 2023

(30) Foreign Application Priority Data
Apr. 29, 2020     (EP) .................................... 20172149

(51) Int. Cl.
*H04W 72/21*        (2023.01)
*H04L 1/08*         (2006.01)

(52) U.S. Cl.
CPC ............... *H04W 72/21* (2023.01); *H04L 1/08* (2013.01)

(58) Field of Classification Search
CPC ........ H04W 72/21; H04W 72/23; H04L 1/08; H04L 5/0044; H04L 5/0076
See application file for complete search history.

(56) References Cited

U.S. PATENT DOCUMENTS

| | | | | |
|---|---|---|---|---|
| 11,356,995 B2 * | 6/2022 | Wei | ........................... | H04L 1/18 |
| 11,558,895 B2 * | 1/2023 | Fröberg | ................ | H04W 72/23 |
| 11,638,282 B2 * | 4/2023 | Bae | ....................... | H04L 1/0072 |
| | | | | 370/336 |
| 11,924,813 B2 * | 3/2024 | Lee | ................... | H04W 72/0446 |
| 2019/0053211 A1 * | 2/2019 | Ying | ................... | H04W 72/044 |

(Continued)

FOREIGN PATENT DOCUMENTS

WO        2019/032748 A1     2/2019

OTHER PUBLICATIONS

International Search Report and Written Opinion dated Jun. 23, 2021 corresponding to International Patent Application No. PCT/IB2021/053383.

(Continued)

*Primary Examiner* — Ayman A Abaza
*Assistant Examiner* — Hooman Houshmand
(74) *Attorney, Agent, or Firm* — Lippes Mathias LLP

(57) ABSTRACT

A user equipment, UE, comprising at least one processor, and memory storing instructions that, when executed by the at least one processor, cause the UE at least to determine how to use resources of a repetition-based uplink grant based on a criterion related to at least one data packet prepared for a transmission on resources associated with the repetition-based uplink grant.

20 Claims, 5 Drawing Sheets

(56)     References Cited

U.S. PATENT DOCUMENTS

2019/0289478 A1*   9/2019   Hosseini ................. H04L 5/003
2019/0349116 A1*  11/2019   Hosseini ............... H04L 1/0011
2020/0267756 A1*   8/2020   Fakoorian ............. H04W 76/27
2021/0068140 A1*   3/2021   Yang .................... H04L 1/0067

OTHER PUBLICATIONS

3GPP TS 38.331 V15.7.0 (Sep. 2019), Technical Specification, 3rd
Generation Partnership Project; Technical Specification Group Radio
Access Network; NR; Radio Resource Control (RRC) protocol
specification (Release 15), Sep. 2019.
Sequans Communications, "Intra-UE Prioritization for IIoT,"
R2-1901547, 3GPP TSG-RAN WG2 Meeting #105, Athens, Greece,
Feb. 25-Mar. 1, 2019, Feb. 15, 2019, XP051602904.
LG Electronics Inc., "Repetition transmission on configured uplink
grant," R2-1801063, 3GPP TSG-RAN WG2 NR Ad hoc, Vancou-
ver, Canada, Jan. 22-26, 2018, Jan. 12, 2018, XP051386557.
Communication pursuant to Article 94(3) EPC dated Mar. 24, 2023,
corresponding to European Patent Application No. 20172149.5.
3GPP TSG RAN WG2 Meeting #108, Reno, USA, Nov. 18-22,
2019 "Consideration on model resource allocation.".
Extended European Search Report received for corresponding Euro-
pean Patent Application No. 20172149.5, dated Oct. 5, 2020, 9
pages.
Office action received for corresponding European Patent Applica-
tion No. 20172149.5, dated Jun. 11, 2025, 6 pages.

* cited by examiner

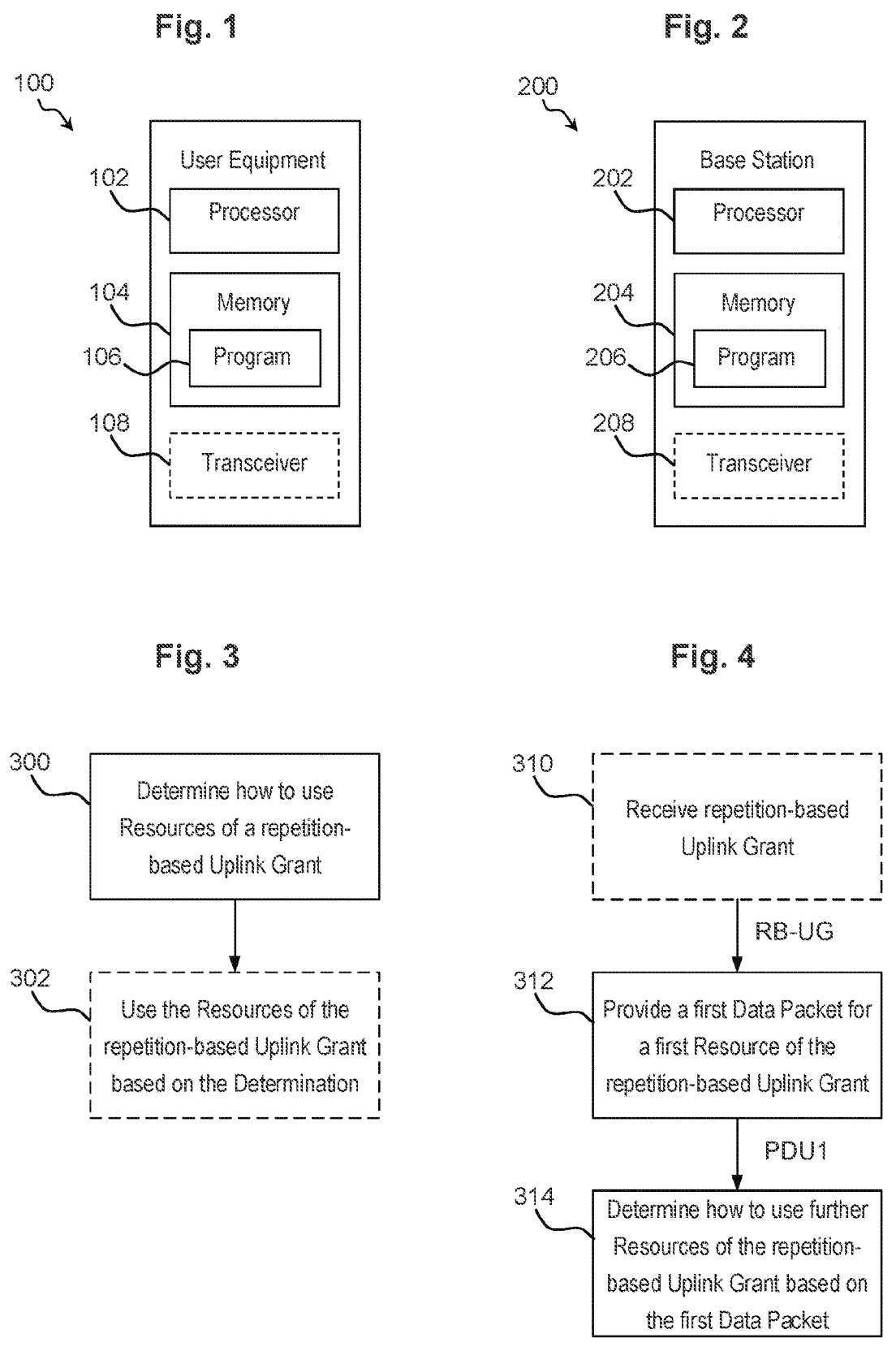

User Equipment

102 — Processor

104 — Memory

106 — Program

108 — Transceiver

Base Station

202 — Processor

204 — Memory

206 — Program

208 — Transceiver

Fig. 3

300 — Determine how to use Resources of a repetition-based Uplink Grant

302 — Use the Resources of the repetition-based Uplink Grant based on the Determination

Fig. 4

310 — Receive repetition-based Uplink Grant

RB-UG

312 — Provide a first Data Packet for a first Resource of the repetition-based Uplink Grant

PDU1

314 — Determine how to use further Resources of the repetition-based Uplink Grant based on the first Data Packet

Fig. 5

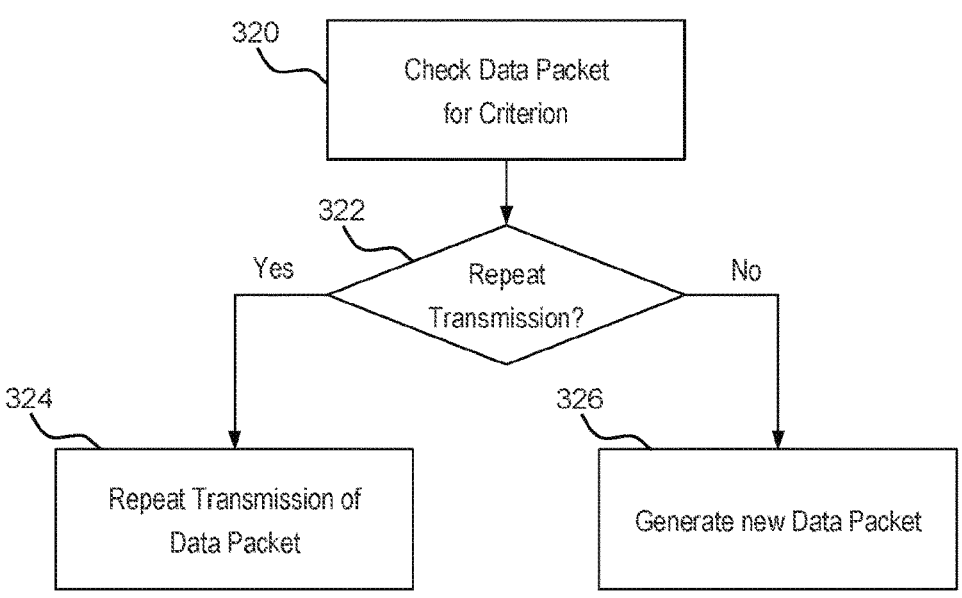

320 — Check Data Packet for Criterion

322 — Repeat Transmission?

Yes

No

324 — Repeat Transmission of Data Packet

326 — Generate new Data Packet

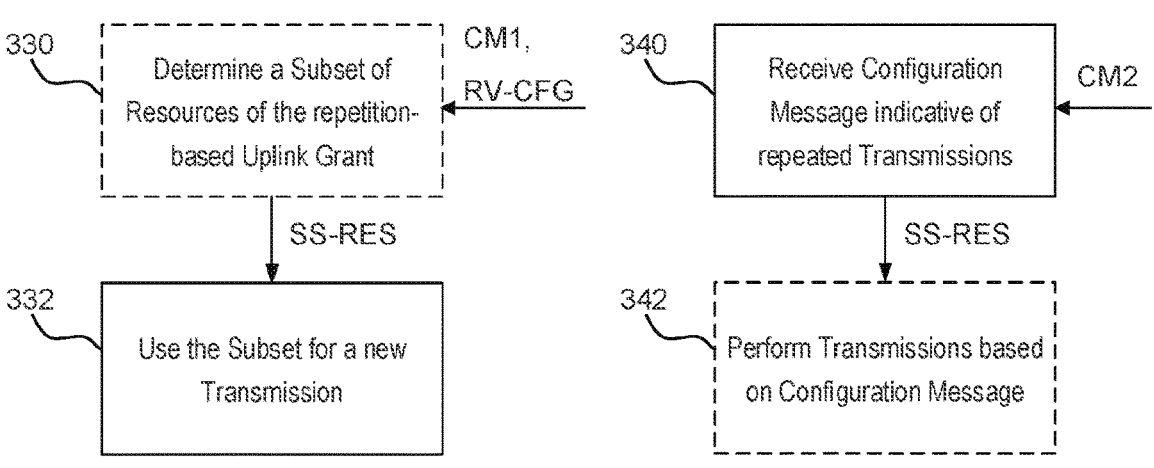

330 — Determine a Subset of Resources of the repetition-based Uplink Grant

CM1, RV-CFG

SS-RES

332 — Use the Subset for a new Transmission

340 — Receive Configuration Message indicative of repeated Transmissions

CM2

SS-RES

342 — Perform Transmissions based on Configuration Message

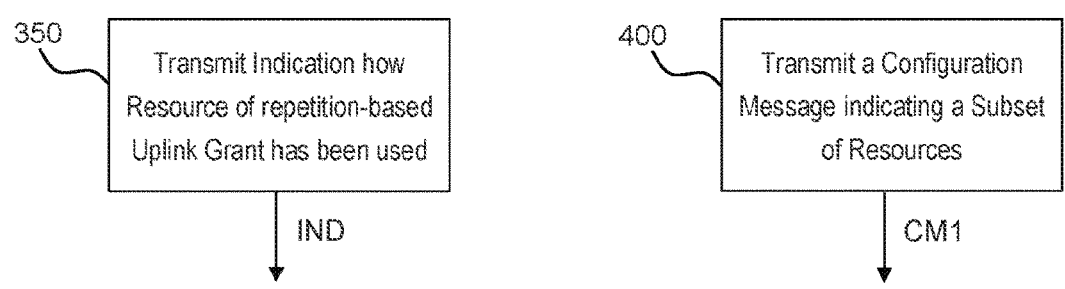

350 — Transmit Indication how Resource of repetition-based Uplink Grant has been used

IND

400 — Transmit a Configuration Message indicating a Subset of Resources

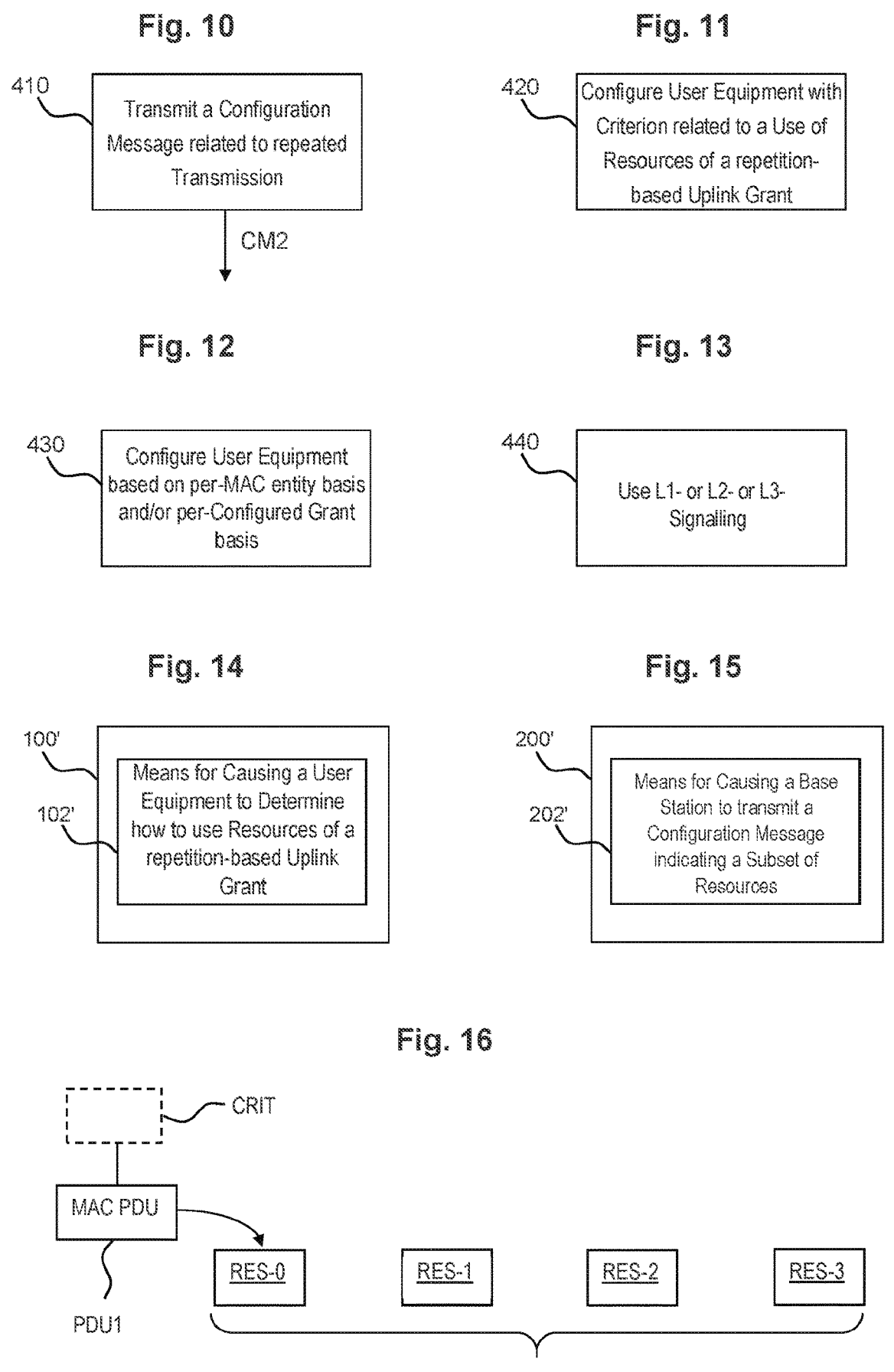

Transmit a Configuration Message related to repeated Transmission

Configure User Equipment with Criterion related to a Use of Resources of a repetition-based Uplink Grant

Configure User Equipment based on per-MAC entity basis and/or per-Configured Grant basis

Use L1- or L2- or L3-Signalling

Means for Causing a User Equipment to Determine how to use Resources of a repetition-based Uplink Grant

Means for Causing a Base Station to transmit a Configuration Message indicating a Subset of Resources

Fig. 16

CRIT

MAC PDU

PDU1

RES-0     RES-1     RES-2     RES-3

USER EQUIPMENT AND BASE STATION FOR MANAGING REPETITION-BASED UPLINK GRANTS IN NR

FIELD OF THE DISCLOSURE

The disclosure relates to a user equipment.

The disclosure further relates to a base station.

The disclosure further relates to a method of operating a user equipment.

The disclosure further relates to a method of operating a base station.

BACKGROUND

In order to fulfil Ultra-Reliable Low-Latency Communications (URLLC) in 5G, several different features have been adopted in 5G NR (New Radio) to facilitate reliable downlink/uplink transmission that can be conducted very rapidly. In particular, for both configured grants (CG) and dynamic grants (DG), an associated uplink radio resource can be configured with repetitions, which means a user equipment (UE) should repeat PUSCH (Physical Uplink Shared Channel) transmission of this grant K>=1 times in a row automatically using pre-assigned resources. This allows HARQ (hybrid automatic repeat request) retransmission/repetition in an autonomous manner, so the UE does not need to wait for further assignment of resources by the base station, e.g., gNB, for re-transmission and hence reducing the data delivery delay.

When processing PUSCH with repetition, the UE should generate a data packet that is to be transmitted on a first resource, and then the same data packet (e.g., same or different redundancy version(s) thereof) is transmitted in the subsequent resources of the same repetition bundle. So, the gNB could quickly combine these repetitions to decode the packet without much delay.

In Rel-16 NR, it was agreed to extend Logical Channel Prioritization (LCP) restrictions by allowing a restrictive mapping between an LCH (Logical Channel) and certain uplink grants including DG and CG. With such mapping restriction, high-priority traffic (such as URLLC) is not mapped into low-priority grants.

SUMMARY

The scope of protection sought for various embodiments of the disclosure is set out by the independent claims. The exemplary embodiments and features, if any, described in this specification, that do not fall under the scope of the independent claims, are to be interpreted as examples useful for understanding various exemplary embodiments of the disclosure.

Some embodiments relate to a user equipment, UE, comprising at least one processor, and memory storing instructions that, when executed by the at least one processor, cause the UE at least to determine how to use resources of a repetition-based uplink grant based on a criterion related to at least one data packet prepared for a transmission on resources associated with the repetition-based uplink grant. This enables to improve a radio resource efficiency of repetition-based PUSCH based on e.g. a type of data to be transmitted.

According to further exemplary embodiments, the UE may e.g. be used for wireless, particularly cellular, communications systems such as of the 5G (fifth generation) type.

Particularly, exemplary embodiments may e.g. be used for enhancing existing procedures of 5G Release 15, thus e.g. enhancing conventional UEs.

According to some embodiments, the at least one data packet may e.g. be a medium access control, MAC, protocol data unit, PDU.

According to some embodiments, the UE may receive the repetition-based uplink grant, e.g. from a gNB.

According to some embodiments, the instructions, when executed by the at least one processor, further cause the UE to: provide a first data packet, e.g. MAC PDU, for a first resource of the repetition-based uplink grant, and to determine how to use further resources of the repetition-based uplink grant based on a criterion related to the first data packet.

According to some embodiments, providing the first data packet, e.g. MAC PDU, for the first resource, e.g., within a repetition bundle, of the repetition-based uplink grant may e.g. be performed using a conventional logical channel prioritization (LCP) procedure.

According to some embodiments, the instructions, when executed by the at least one processor, further cause the UE to: check the at least one data packet, e.g. MAC PDU, for the criterion, and to determine, based on the check, whether to repeat a transmission of the at least one data packet or to generate a new transmission, e.g. of at least one new data packet, e.g. with data which is still in a buffer, e.g. using at least a part of the remaining resources of the repetition bundle.

According to some embodiments, the UE may determine whether the new transmission should be applied in subsequent, e.g. at least a part of the remaining, resources in the repetition bundle either before or after the PUSCH of the first generated data packet, e.g. MAC PDU, is transmitted. In other words, according to some embodiments, the at least one data packet, e.g. MAC PDU, may be first transmitted using e.g. a first resource of the repetition bundle, and after that, the UE may determine whether the new transmission should be applied in subsequent, e.g. at least a part of the remaining, resources in the repetition bundle. According to some embodiments, however, the at least one data packet, e.g. MAC PDU, may be transmitted using e.g. a first resource of the repetition bundle after the UE has determined whether the new transmission should be applied in subsequent, e.g. at least a part of the remaining, resources in the repetition bundle.

According to some embodiments, the criterion comprises at least one of: a) at least one logical channel, LCH, from a preconfigured LCH subset is mapped to the at least one data packet, e.g. first data packet b) medium access control, MAC, control elements, CE, mapped to the at least one data packet, b1) a type, e.g. characterizing a priority, of MAC CEs mapped to the at least one data packet, b2) LCHs the MAC CEs mapped to the at least one data packet are relating to (e.g. the logical channel (LCH)/logical channel group (LCG) that a buffer status report (BSR) is concerning), c) a presence of MAC service data units, SDUs, from a Signaling Radio Bearer, SRB, in the at least one data packet, d) quality of service, QoS, parameters (e.g., QFI (QoS Flow Identifier), PDB (Packet Delay Budget), survival time, etc.) relating to data conveyed in the at least one data packet, e) availability of relatively higher priority data as compared to the at least one data packet (e.g., the UE may generate the new transmission if it can build new MAC PDU for the subsequent resources that have higher priority than the MAC PDU prepared for the first resource of the bundle), f) availability of data from certain LCH or availability of certain MAC CE (e.g., the UE 100 may generate the new transmission if it can build new MAC PDU for the subsequent resources RES-1, RES-2, RES-3 that contains data from certain LCH or certain MAC CE), g) MAC entity, h) configured grant, CG, configuration.

According to some embodiments, the instructions, when executed by the at least one processor, cause the UE at least to determine how to use resources of a repetition-based uplink grant based on an availability of data from certain (e.g., at least one predetermined) LCH or based on an intention of transmitting a certain MAC CE (e.g., the UE may generate the new transmission if it can build new MAC PDU for the subsequent resources that contains data from certain LCH or certain MAC CE).

According to some embodiments, if at least one logical channel, LCH, from a preconfigured LCH subset is mapped to the at least one data packet, the pre-configured LCH subset may be determined based on a per-LCH configuration. For instance, according to some embodiments, the gNB may configure at least some, e.g. several or each, LCH by RRC (radio resource control), e.g. indicating whether the data from a specific LCH should be transmitted using repetition, so the subset may comprise LCHs that may have such configuration or LCHs that do not have such configuration.

According to some embodiments, the gNB may indicate a number of repetitions that may be applied to data from at least one LCH.

According to some embodiments, the pre-configured LCH subset may be determined based on other parameters configured for a LCH. For instance, the subset may comprise LCHs with priority equal to or higher than a predefined threshold.

According to some embodiments, the instructions, when executed by the at least one processor, further cause the UE to: use a subset of the resources of the repetition-based uplink grant for a or the new transmission, e.g. some, but not all, resources of the repetition bundle.

According to some embodiments, the instructions, when executed by the at least one processor, further cause the UE to: determine the subset based on at least one of: a) a configuration message, b) a redundancy version (RV) configuration of a repetition.

According to some embodiments, the gNB may also configure, e.g. for a repetition-based PUSCH, a number of repetitions that a MAC PDU should be transmitted using this PUSCH. According to some embodiments, for example, for a configured grant with repetitions, the gNB may indicate that the UE can begin to see if a new transmission can be used starting from the third resource of the CG occasion bundle, which means the MAC PDU generated for the first resource of the bundle is transmitted at least twice before a new transmission can be considered.

According to some embodiments, the gNB may indicate a subset of resources, e.g. within a repetition bundle, using which the UE may perform new transmission if certain criteria are met.

According to some embodiments, the subset of resources, e.g. within a repetition bundle, could be implicitly configured via redundancy version, RV, configuration of a repetition. For instance, for a repetition with K=4 and RV configuration={0, 3, 0, 3}, it means new transmission begin in the second resource in the bundle (or e.g. in a third resource, e.g. depending on an initial number of (repetitions) of the first resource). On the other hand, for a repetition with K=4 and RV configuration={0, 0, 0, 0}, new transmission can begin in any resource in the bundle.

According to some embodiments, the instructions, when executed by the at least one processor, further cause the UE to: receive a configuration message indicating at least one of: a) whether to apply repeated transmissions to data associated with different levels of QoS (e.g., LCHs for different DRB (data radio bearer)/SRB (signaling radio bearer) and/or MAC CEs)), b) subsets of LCHs where repeated transmissions should be applied.

According to some embodiments, the instructions, when executed by the at least one processor, further cause the UE to: transmit an indication indicating how a radio resource of the repetition-based uplink grant has been used by the UE.

According to some embodiments, the UE may provide an indication to notify the gNB whether a new transmission has been used for the subsequent resources within the bundle, as well as the HARQ process ID of the new transmission (e.g., in cases where the UE may determine the HARQ processes for new transmission itself).

According to some embodiments, such indication may be explicitly multiplexed into the PUSCH, e.g. as a UCI (Uplink Control Information).

According to some embodiments, alternatively, or additionally, the UE may send this indication implicitly, such as using different DMRS (Demodulation Reference Signal) sequences and/or patterns and/or mapping or different OCC (orthogonal cover codes) for the PUSCH transmission, or using an uplink beam direction or spatial relation (e.g., assuming the UE and/or the gNB has multiple antennas) of the PUSCH.

According to some embodiments, alternatively, or additionally, the UE may send this indication on, e.g., dedicated or shared, PUCCH resources.

According to some embodiments, such information may be carried with separate UCI, e.g. as currently specified for NR-U operation. According to some embodiments, a HARQ PID notification may be extended from AUL-UCI (Autonomous Uplink control information) mechanism defined for LTE/NR in unlicensed band operation.

Some embodiments relate to a base station comprising at least one processor, and memory storing instructions that, when executed by the at least one processor, cause the base station at least to: transmit a first configuration message indicating a subset of resources of a repetition-based uplink grant a user equipment, UE, may use for a new transmission.

According to further exemplary embodiments, the base station may e.g. be used for wireless, particularly cellular, communications systems such as of the 5G (fifth generation) type. Particularly, exemplary embodiments may e.g. be used for enhancing existing procedures of 5G Release 15, thus e.g. enhancing a conventional gNodeB (gNB).

According to some embodiments, the instructions, when executed by the at least one processor, further cause the base station to transmit a second configuration message indicating at least one of: a) whether to apply repeated transmissions to data associated with different levels of QoS, b) subsets of LCHs where repeated transmissions should be applied.

According to some embodiments, both the first configuration message and the second configuration message may be jointly sent, e.g. in form of one, i.e. single, configuration message.

According to some embodiments, the instructions, when executed by the at least one processor, further cause the base station to configure the UE with a criterion based on which the UE may determine how to use the resources of the repetition-based uplink grant.

According to some embodiments, the instructions, when executed by the at least one processor, further cause the base station to configure the UE based on at least one of: a) per-MAC entity basis, b) per-Configured Grant basis, c) per-LCH basis.

According to some embodiments, the instructions, when executed by the at least one processor, further cause the base station to use at least one of Layer-1, L1, signalling or Layer-2, L-2, signalling, or Layer-3, L-3 signalling (e.g. RRC messages), for at least one of: a) transmitting the first configuration message, b) transmitting the second configuration message, c) configuring the UE.

According to some embodiments, the proposed UE behaviour, i.e., whether the UE should determine how to use resources of a repetition-based uplink grant based on a criterion related to at least one data packet prepared for a transmission on resources associated with the repetition-based uplink grant, may be configured by the gNB in a per-MAC entity (i.e. the UE may conduct such behaviour for some MAC entities, but may not conduct such behaviour for some other MAC entities). According to some embodiments, the gNB may configure the UE to determine how to use resources of a repetition-based uplink grant based on a criterion related to at least one data packet prepared for a transmission on resources associated with the repetition-based uplink grant for one or more predetermined MAC entities.

According to some embodiments, the gNB may configure the UE to determine how to use resources of a repetition-based uplink grant based on a criterion related to at least one data packet prepared for a transmission on resources associated with the repetition-based uplink grant in a per-CG configuration manner (i.e. the UE may conduct such behaviour for resources pertaining to certain CG configuration, which may e.g. be determined by the gNB).

According to some embodiments, the gNB may configure the UE to determine how to use resources of a repetition-based uplink grant based on a criterion related to at least one data packet prepared for a transmission on resources associated with the repetition-based uplink grant in a per-LCH manner (i.e. the UE may conduct such behaviour for resources associated or restricted to certain LCH, which may e.g. be determined by the gNB).

According to some embodiments, the criterion or criteria that may be used by the UE to determine if a new transmission can be applied within a repetition bundle can be either configured, e.g. by the gNB, or may be fixed, e.g. by specification.

Moreover, according to some embodiments, configurations relating to the proposed UE behaviour may be dynamically controlled and/or updated (e.g. deactivation/activation, change of criteria, etc.), e.g. by L1 or L2 signalling (e.g. DCI (Downlink Control Information), MAC CE), or by L3 signalling, e.g. RRC signalling.

Some embodiments relate to a method of operating a user equipment, UE, wherein the UE determines how to use resources of a repetition-based uplink grant based on a criterion related to at least one data packet prepared for a transmission on resources associated with the repetition-based uplink grant.

Some embodiments relate to a method of operating a base station, wherein the base station transmits a first configuration message indicating a subset of resources of a repetition-based uplink grant a user equipment, UE, may use for a new transmission.

Some embodiments relate to an apparatus comprising means for causing a user equipment, UE, at least to determine how to use resources of a repetition-based uplink grant based on a criterion related to at least one data packet prepared for a transmission on resources associated with the repetition-based uplink grant.

According to some embodiments, the means may be configured to cause the UE to perform at least one further step of any of the embodiments explained above.

Some embodiments relate to an apparatus comprising means for causing a base station to transmit a first configuration message indicating a subset of resources of a repetition-based uplink grant a user equipment, UE, may use for a new transmission.

According to some embodiments, the means may be configured to cause the base station to perform at least one further step of any of the embodiments explained above.

BRIEF DESCRIPTION OF THE FIGURES

Some exemplary embodiments will now be described with reference to the accompanying drawings in which:

FIG. 1 schematically depicts a simplified block diagram of a user equipment according to some embodiments, FIG. 2 schematically depicts a simplified block diagram of a base station according to some embodiments, FIG. 3 schematically depicts a simplified flow chart of a method according to some embodiments, FIG. 4 schematically depicts a simplified flow in which a UE receives a repetition based uplink grant, according to some embodiments, FIG. 5 schematically depicts a simplified flow in which a UE checks a data packet for criterion, according to some embodiments, FIG. 6 schematically depicts a simplified flow in which a UE determines a subset of resources of the repetition-based uplink grant, according to some embodiments, FIG. 7 schematically depicts a simplified flow in which a UE receives a configuration message indicative of repeated transmissions, according to some embodiments, FIG. 8 schematically depicts a simplified flow in which a UE transmits an indication of how a resource of a repetition based uplink grant has been used, according to some embodiments, FIG. 9 schematically depicts a simplified flow in which a base station transmits a configuration message indicating a subset of resources, according to some embodiments, FIG. 10 schematically depicts a simplified flow in which a base station transmits a configuration message related to repeated repetitions, according to some embodiments, FIG. 11 schematically depicts a simplified flow in which a base station configures a UE with a criterion related to a use of resources of a repetition based uplink grant, according to some embodiments, FIG. 12 schematically depicts a simplified flow in which a base station configures a UE on a per MAC entity and/or a per configured grant basis, according to some embodiments, FIG. 13 schematically depicts a simplified flow in which a base station uses L1, L2, and/or L3 signaling, according to some embodiments, FIG. 14 schematically depicts a simplified block diagram of an apparatus for causing a UE to determine how to use resources of a repetition based uplink grant, according to some embodiments, FIG. 15 schematically depicts a simplified block diagram of an apparatus for causing a base station to transmit a configuration message indicating a subset of resources, according to some embodiments, FIG. 16 schematically depicts resources according to some embodiments, FIG. 17 schematically depicts a simplified flow chart according to some embodiments, and FIG. 18 schematically depicts a simplified signaling chart according to some embodiments.

DESCRIPTION OF SOME EMBODIMENTS

Figure 17:
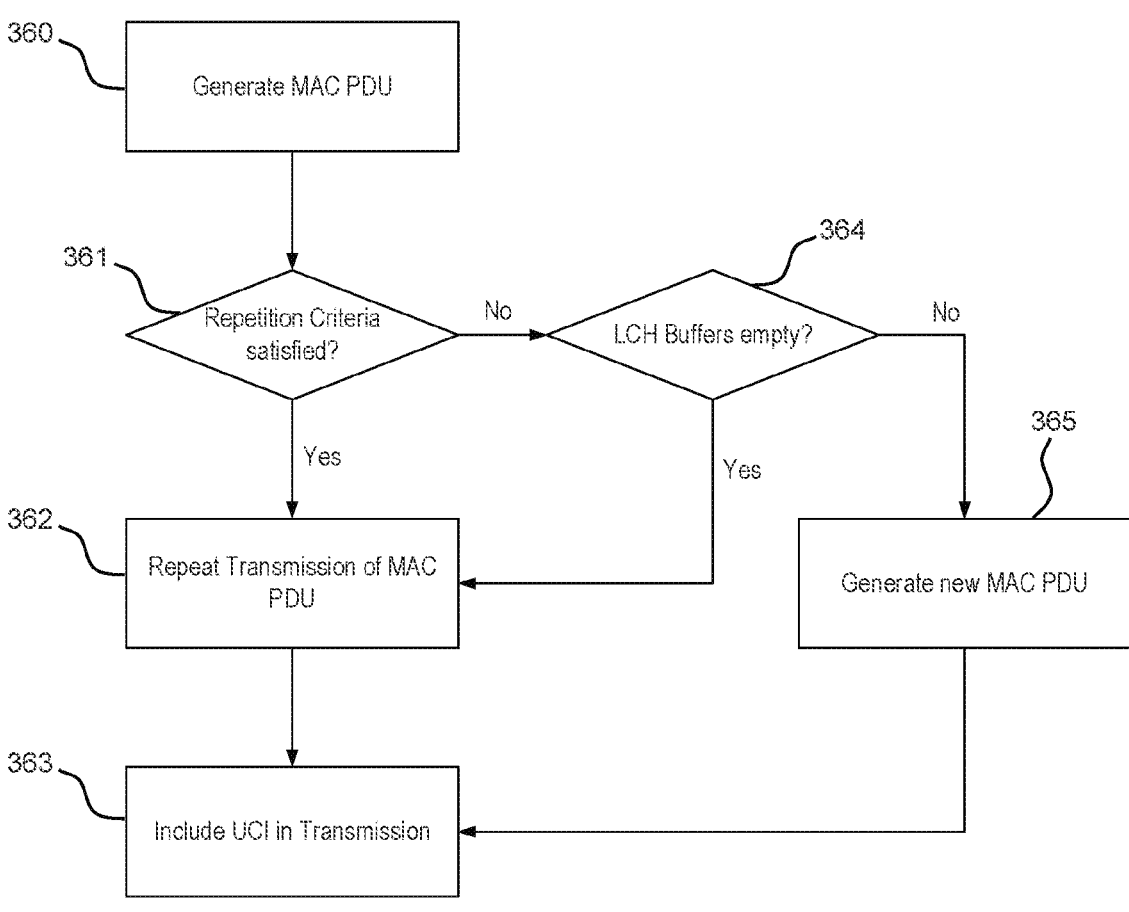

FIG. 1 schematically depicts a simplified block diagram of a user equipment, UE, 100 according to some embodiments. The UE 100 may comprise at least one processor 102, and memory 104 storing instructions 106, e.g. in form of a computer program. The UE 100 may also comprise a transceiver 108 for exchanging, i.e. transmitting and/or receiving, radio frequency, RF, signals with other components such as e.g. a base station 200, cf. FIG. 2.

According to some embodiments, the UE 100 may e.g. be used for wireless, particularly cellular, communications systems such as of the 5G (fifth generation) type. Particularly, exemplary embodiments may e.g. be used for enhancing existing procedures of 5G Release 15, thus e.g. enhancing conventional UEs.

According to some embodiments, also cf. the flow chart of FIG. 3, the instructions 106 (FIG. 1), when executed by the at least one processor 102, cause the UE 100 at least to determine 300 (FIG. 3) how to use resources of a repetition-based uplink grant based on a criterion related to at least one data packet prepared for a transmission on resources associated with the repetition-based uplink grant. This enables to improve a radio resource efficiency of repetition-based PUSCH based on e.g. a type of data to be transmitted. According to some embodiments, based on the determination 300, the resources of the repetition-based uplink grant may be used, cf. step 302 of FIG. 3.

According to some embodiments, the at least one data packet may e.g. be a medium access control, MAC, protocol data unit, PDU.

In this regard, FIG. 16 schematically depicts PUSCH resources RES-0, RES-1, RES-2, RES-3, collectively indicated with the curly bracket, e.g. corresponding with a CG occasion with K=4 repetitions according to an exemplary repetition-based uplink grant.

According to some embodiments, cf. e.g. FIG. 4, the instructions 106 (FIG. 1), when executed by the at least one processor 102, further cause the UE 100 to: provide 312 a first data packet PDU1 (FIG. 16), e.g. MAC PDU, for a first resource RES-0 of the repetition-based uplink grant RB-UG, and to determine 314 how to use further resources RES-1, RES-2, RES-3 (FIG. 16) of the repetition-based uplink grant based on a criterion CRIT related to the first data packet PDU1.

As an example, depending on the criterion CRIT and/or the contents (e.g., the LCHs that have been mapped, or the highest priority of LCHs) of the first data packet PDU1, the UE 100 may determine whether it should use at least a part of the remaining resources RES-1, RES-2, RES-3 to repeat a transmission of the first data packet PDU1 or it should use at least a part of the remaining resources RES-1, RES-2, RES-3 for at least one new transmission, e.g. by generating new data packets, e.g. MAC PDUs.

According to some embodiments, the UE 100 may receive the repetition-based uplink grant RB-UG, e.g. from a gNB, cf. step 310 of FIG. 4.

According to some embodiments, providing the first data packet, e.g. MAC PDU, (cf. e.g. step 312 of FIG. 4) for the first resource RES-0, e.g., within a repetition bundle, of the repetition-based uplink grant, may e.g. be performed using a conventional logical channel prioritization (LCP) procedure.

According to some embodiments, the instructions 106, when executed by the at least one processor 102, further cause the UE 100 to, cf. FIG. 5: check 320 the at least one data packet PDU1 (FIG. 16), for the criterion CRIT, and to determine 322 (FIG. 5), based on the check 320, whether to repeat 324 a transmission of the at least one data packet PDU1 or to generate 326 a new transmission, e.g. with data which is still in a buffer, e.g. using at least a part of the remaining resources RES-1, RES-2, RES-3 of the repetition bundle.

According to some embodiments, the UE 100 may make the determination 322 whether the new transmission should be applied in subsequent, e.g. at least a part of the remaining, resources RES-1, RES-2, RES-3 in the repetition bundle either before or after the PUSCH of the first generated data packet PDU1 (FIG. 16) is transmitted. In other words, according to some embodiments, the at least one data packet PDU1 may be first transmitted using e.g. a first resource RES-0 of the repetition bundle, and after that, the UE 100 may determine 322 whether the new transmission should be applied in subsequent, e.g. at least a part of the remaining, resources in the repetition bundle.

According to some embodiments, however, the at least one data packet PDU1 may be transmitted using e.g. the first resource RES-0 of the repetition bundle after the UE 100 has determined 322 whether the new transmission should be applied in subsequent resources in the repetition bundle.

According to some embodiments, the criterion CRIT (FIG. 16) comprises at least one of: a) at least one logical channel, LCH, from a preconfigured LCH subset is mapped to the at least one data packet PDU1, e.g. first data packet or MAC PDU, respectively, b) medium access control, MAC, control elements, CE, mapped to the at least one data packet PDU1, b1) a type of MAC CEs mapped to the at least one data packet PDU1, b2) LCHs the MAC CEs mapped to the at least one data packet PDU1 are relating to (e.g. the logical channel (LCH)/logical channel group (LCG) that a buffer status report (BSR) is concerning), c) a presence of MAC service data units, SDUs, from a Signaling Radio Bearer, SRB, in the at least one data packet PDU1, d) quality of service, QoS, parameters (e.g., QFI (QoS Flow Identifier), PDB (Packet Delay Budget), survival time, etc.) relating to data conveyed in the at least one data packet PDU1, e) availability of relatively higher priority data as compared to the at least one data packet PDU1 (e.g., the UE 100 may generate the new transmission if it can build new MAC PDU for the subsequent resources RES-1, RES-2, RES-3 that have higher priority than the MAC PDU PDU1 prepared for the first resource RES-0 of the bundle), f) availability of data from certain LCH or MAC CE (e.g., the UE 100 may generate the new transmission if it can build new MAC PDU for the subsequent resources RES-1, RES-2, RES-3 that contains data from certain LCH or certain MAC CE), g) MAC entity, h) configured grant, CG, configuration.

According to some embodiments, if at least one logical channel, LCH, from a preconfigured LCH subset is mapped to the at least one data packet PDU1, the pre-configured LCH subset may be determined based on a per-LCH configuration. For instance, according to some embodiments, a base station 200 (FIG. 2), e.g. gNB, may configure at least some, e.g. several or each, LCH by RRC (radio resource control), e.g. indicating whether data from a specific LCH should be transmitted using repetition, so the subset may comprise LCHs that may have such configuration or of LCHs that do not have such configuration.

According to some embodiments, the gNB 200 (FIG. 2) may indicate a number of repetitions that may be applied to data from at least one LCH.

According to some embodiments, e.g., alternatively, the gNB 200 may indicate a time window wherein repetitions should be applied to data from at least one LCH. As an example, according to some embodiments, instead of configuring a number of repetitions for the LCH, the UE may be configured with a timer for each LCH or selected LCHs. According to some embodiments, depending on the value of the timer, the UE may determine how to use the resource(s), e.g. the resources of the repetition-based uplink grant RB-UG. According to some embodiments, the timer may also be seen as characterizing a delay budget or a survival time.

According to some embodiments, the pre-configured LCH subset may be determined based on other parameters configured for a LCH. For instance, the subset may comprise LCHs with priority equal to or higher than a predefined threshold.

According to some embodiments, the instructions 106, when executed by the at least one processor 102, further cause the UE 100 to, cf. FIG. 6: use 332 a subset SS-RES of the resources of the repetition-based uplink grant RB-UG for a or the new transmission, e.g. some, but not all, resources of the repetition bundle.

According to some embodiments, the instructions 106, when executed by the at least one processor 102, further cause the UE 100 to: determine 330 the subset SS-RES based on at least one of: a) a configuration message CM1, b) a redundancy version (RV) configuration RV-CFG of a repetition.

According to some embodiments, the gNB 200 may configure, e.g. for a repetition-based PUSCH, a number of repetitions that a MAC PDU (cf. PDU1, FIG. 16) should be transmitted using this PUSCH. According to some embodiments, for example, for a configured grant with repetitions, the gNB 200 may indicate that the UE 100 can begin to see if a new transmission can be used starting from e.g. the third resource RES-2 (FIG. 16) of the CG occasion bundle (i.e., repetition bundle), which means the MAC PDU PDU1 generated for the first resource RES-0 of the bundle is transmitted at least twice before a new transmission can be considered.

According to some embodiments, the gNB 200 may indicate a subset SS-RES of resources, e.g. within a repetition bundle, using which the UE 100 may perform new transmission if certain criteria are met.

According to some embodiments, the subset SS-RES could be implicitly configured via RV configuration of a repetition. For instance, for a repetition with K=4 and RV configuration={0, 3, 0, 3}, it means new transmission begin in the third resource in the bundle. On the other hand, for a repetition with K=4 and RV configuration={0, 0, 0, 0}, new transmission can begin in any resource in the bundle.

According to some embodiments, cf. FIG. 7, the instructions 106, when executed by the at least one processor 102, further cause the UE 100 to: receive 340 a configuration message CM2 indicating at least one of: a) whether to apply repeated transmissions to data associated with different levels of QoS (e.g., LCHs for different DRB (data radio bearer)/SRB (signaling radio bearer) and/or MAC CEs)), b) subsets of LCHs where repeated transmissions should be applied. According to some embodiments, after the receiving step 340, the UE 100 may perform transmissions based on the configuration message CM2, cf. step 342.

According to some embodiments, cf. FIG. 8, the instructions 106, when executed by the at least one processor 102, further cause the UE 100 to: transmit 350 an indication IND indicating, e.g. to the gNB 200, how a radio resource of the repetition-based uplink grant RB-UG has been used by the UE 100 (i.e., for (repeated) transmissions of the first data packet PDU1 and/or for new transmissions).

According to some embodiments, the UE 100 may provide an indication IND to notify the gNB 200 whether a new transmission has been used for the subsequent resources RES-1, RES-2, RES-3 within the bundle, and, optionally, as well a HARQ process ID of the new transmission (e.g., in cases where the UE may determine the HARQ processes for new transmission itself).

According to some embodiments, such indication IND may be explicitly multiplexed into the PUSCH, e.g. as a UCI (Uplink Control Information).

According to some embodiments, alternatively, or additionally, the UE 100 may send this indication IND implicitly, such as using different DMRS (Demodulation Reference Signal) sequences and/or patterns and/or mapping or different OCC (orthogonal cover codes) for the PUSCH transmission, or using an uplink beam direction or spatial relation (e.g., assuming the UE 100 and/or the gNB 200 has multiple antennas) of the PUSCH.

According to some embodiments, alternatively, or additionally, the UE 100 may send the indication IND on, e.g., dedicated, PUCCH resources.

According to some embodiments, the indication IND may be carried with separate UCI, e.g. as currently specified for NR-U operation. According to some embodiments, a HARQ PID notification may be extended from AUL-UCI (Autonomous Uplink control information) mechanism defined for LTE/NR in unlicensed band operation.

According to some embodiments the base station, e.g. the gNB, 200 (FIG. 2) comprises at least one processor 202, and memory 204 storing instructions 206 (e.g., in form of at least one computer program). Optionally, the gNB 200 may comprise a transceiver 208 for wireless data exchange with at least one further entity, e.g. the UE 100.

According to some embodiments, cf. FIG. 9, the instructions 206, when executed by the at least one processor 202, cause the base station 200 at least to transmit 400 a first configuration message CM1 indicating a subset SS-RES (also cf. FIG. 6) of resources of a repetition-based uplink grant a UE 100 may use for a new transmission.

According to further exemplary embodiments, the base station 200 may e.g. be used for wireless, particularly cellular, communications systems such as of the 5G (fifth generation) type. Particularly, exemplary embodiments may e.g. be used for enhancing existing procedures of 5G Release 15, thus e.g. enhancing a conventional gNodeB (gNB).

According to some embodiments, cf. FIG. 10, the instructions 206, when executed by the at least one processor 202, further cause the base station 200 to transmit 410 a second configuration message CM2 indicating at least one of: a) whether to apply repeated transmissions to data associated with different levels of QoS, b) subsets of LCHs where repeated transmissions should be applied. According to some embodiments, the second configuration message CM2 may e.g. be received by the UE as explained above with reference to FIG. 7.

According to some embodiments, the instructions 206, when executed by the at least one processor 202, further cause the base station 200 to configure, cf. step 420 of FIG. 11, the UE 100 with a criterion CRIT (also cf. FIG. 16) based on which the UE 100 may determine (cf. e.g. step 300 of FIG. 3) how to use the resources of the repetition-based uplink grant RB-UG.

According to some embodiments, the instructions 206, when executed by the at least one processor 202, further cause the base station 200 to configure, cf. step 430 of FIG. 12, the UE 100 based on at least one of: a) per-MAC entity basis, b) per-Configured Grant basis, c) per-LCH basis. According to some embodiments, this enables the UE 100 to apply the procedure according to some embodiments, e.g. according to step 300 of FIG. 3, for specific MAC entities and/or CGs.

According to some embodiments, cf. FIG. 13, the instructions 206, when executed by the at least one processor 202, further cause the base station 200 to use 440 at least one of Layer-1, L1, signalling, Layer-2, L-2, signalling, or Layer-3, L3, signaling (e.g. RRC) for at least one of: a) transmitting the first configuration message, b) transmitting the second configuration message, c) configuring the UE.

According to some embodiments, the proposed UE behaviour, i.e., whether the UE 100 should determine 300 (FIG. 3) how to use resources of a repetition-based uplink grant based on a criterion related to at least one data packet prepared for a transmission on resources associated with the repetition-based uplink grant, may be configured by the gNB 200 in a per-MAC entity (i.e. the UE 100 may conduct such behaviour 300 for some MAC entities, but may not conduct such behaviour for some other MAC entities). According to some embodiments, the gNB 200 may configure the UE 100 to determine 300 how to use resources of a repetition-based uplink grant based on a criterion related to at least one data packet prepared for a transmission on resources associated with the repetition-based uplink grant for one or more predetermined MAC entities.

According to some embodiments, the gNB 200 may configure the UE 100 to determine 300 how to use resources of a repetition-based uplink grant based on a criterion related to at least one data packet prepared for a transmission on resources associated with the repetition-based uplink grant in a per-CG configuration manner (i.e. the UE 100 may conduct such behaviour 300 for resources pertaining to certain CG configuration, which may e.g. be determined by the gNB 200).

According to some embodiments, the gNB 200 may configure the UE 100 to determine 300 how to use resources of a repetition-based uplink grant based on a criterion related to at least one data packet prepared for a transmission on resources associated with the repetition-based uplink grant in a per-LCH configuration manner (i.e. the UE 100 may conduct such behaviour 300 for resources associated or restricted to certain LCH, which may e.g. be determined by the gNB 200).

According to some embodiments, the criterion CRIT or criteria that may be used by the UE 100 to determine 300 if a new transmission can be applied within a repetition bundle can be pre-configured, e.g. by the gNB 200.

According to some embodiments, the criterion CRIT or criteria that may be used by the UE 100 to determine 300 if a new transmission can be applied within a repetition bundle can fixed, e.g. provided by specification.

Moreover, according to some embodiments, configurations relating to the proposed UE behaviour (e.g., performing step 300) may be dynamically controlled and/or updated (e.g. deactivation/activation, change of criteria CRIT, etc.), e.g. by L1 or L2 signalling (e.g. DCI (Downlink Control Information), MAC CE) or L3 signalling.

Some embodiments relate to a method of operating a UE 100, wherein the UE 100 determines 300 (FIG. 3) how to use resources of a repetition-based uplink grant based on a criterion CRIT (FIG. 16) related to at least one data packet PDU1 prepared for a transmission on resources RES-0 associated with the repetition-based uplink grant.

Some embodiments relate to a method of operating a base station, e.g. gNB, 200, wherein the base station 200 transmits 400 a first configuration message CM1 indicating subset of resources of a repetition-based uplink grant the UE 100 may use for a new transmission.

Some embodiments, cf. FIG. 14, relate to an apparatus 100' comprising means 102' for causing a UE 100 at least to determine 300 how to use resources of a repetition-based uplink grant RB-UG based on a criterion CRIT related to at least one data packet PDU1 prepared for a transmission on resources associated with the repetition-based uplink grant.

According to some embodiments, the means 102' may be configured to cause the UE 100 to perform at least one further step of any of the embodiments related to UE 100 explained above.

Some embodiments, cf. FIG. 15, relate to an apparatus 200' comprising means 202' for causing a base station 200 to transmit 400 a first configuration message CM1 indicating a subset of resources of a repetition-based uplink grant a UE 100 may use for a new transmission.

According to some embodiments, the means 202' may be configured to cause the base station 200 to perform at least one further step of any of the embodiments related to a base station explained above.

FIG. 17 schematically depicts a simplified flow chart according to some embodiments. As an example, the gNB 200 (FIG. 2) configures, e.g. via RRC, a UE 100 whether at least one, e.g. some or each, of the LCH should be transmitted: with repetition or without repetition (according to some embodiments, this may e.g. be implemented by presenting a new field in the information element (IE) of "LogicalChannelConfig" in an RRC message, as e.g. defined in TS 38.331 version 15.7.0).

According to some embodiments, alternatively, or additionally, this (e.g., the information whether at least one, e.g. some or each, of the LCH should be transmitted with repetition or without repetition) may be implicitly indicated by other LCH parameters, such as priority or PBR (prioritized bit rate).

In step 360, when processing an uplink grant with repetition (e.g. a CG occasion configured with repetition, also cf. the repetition-based uplink grant RB-UG of e.g. FIG. 4), the UE 100 may generate a MAC PDU PDU1 (FIG. 16) for the first repetition resource RES-0, e.g. based on conventional LCP procedures.

In step 361, the UE may check if the generated MAC PDU PDU1 contains data from an LCH configured with "Repetition", i.e. for which repetition transmission should be applied.

If so, according to some embodiments, the UE 100 does not generate a new PDU, but repeats 362 transmission of the same data packet PDU1 in one or more of the subsequent resources RES-1, RES-2, RES-3, e.g., same or different redundancy version(s) thereof.

According to some embodiments, a MAC of the UE 100 may instruct a PHY of the UE 100 to transmit the same PDU in subsequent repetition(s). According to some embodiments, the subsequent repetition(s) may be performed with different RV, e.g. according to a configuration.

Otherwise, e.g., if repetition transmission should not be applied, the UE 100 (or its MAC, respectively) uses at least some of the remaining repetition resources RES-1, RES-2, RES-3 (FIG. 16) for new transmission, and generates new PDU for transmission in at least one of the subsequent repetition resources RES-1, RES-2, RES-3. Optionally, the UE 100 may check, whether LCH buffers are empty, cf. step 364 of FIG. 17, and, if they are not empty, the UE may generate new MAC PDU, cf. step 365.

According to some embodiments, if the LCH buffers are empty (i.e., if the buffers of the LCHs that may be mapped to the instant grant are empty), i.e. there is no other data to be transmitted, the UE 100 may perform repeated transmission of step 362, even if earlier in step 361 it has been determined based on the first MAC PDU PDU1 or the criterion CRIT related to it that no repeated transmissions should be performed. Alternatively, according to some embodiments, the UE 100 may choose to skip the remaining resources RES-1, RES-2, RES-3 of the repetition bundle.

According to some embodiments, HARQ process switching may be performed if a new MAC PDU is generated (i.e. the HARQ process associating to subsequent resource should be changed).

According to some embodiments, a notification (e.g. by UCI) may be sent to the gNB 200, cf. step 363, so gNB is informed on the new uplink transmissions related to the new MAC PDU(s), cf. step 365.

Figure 18:
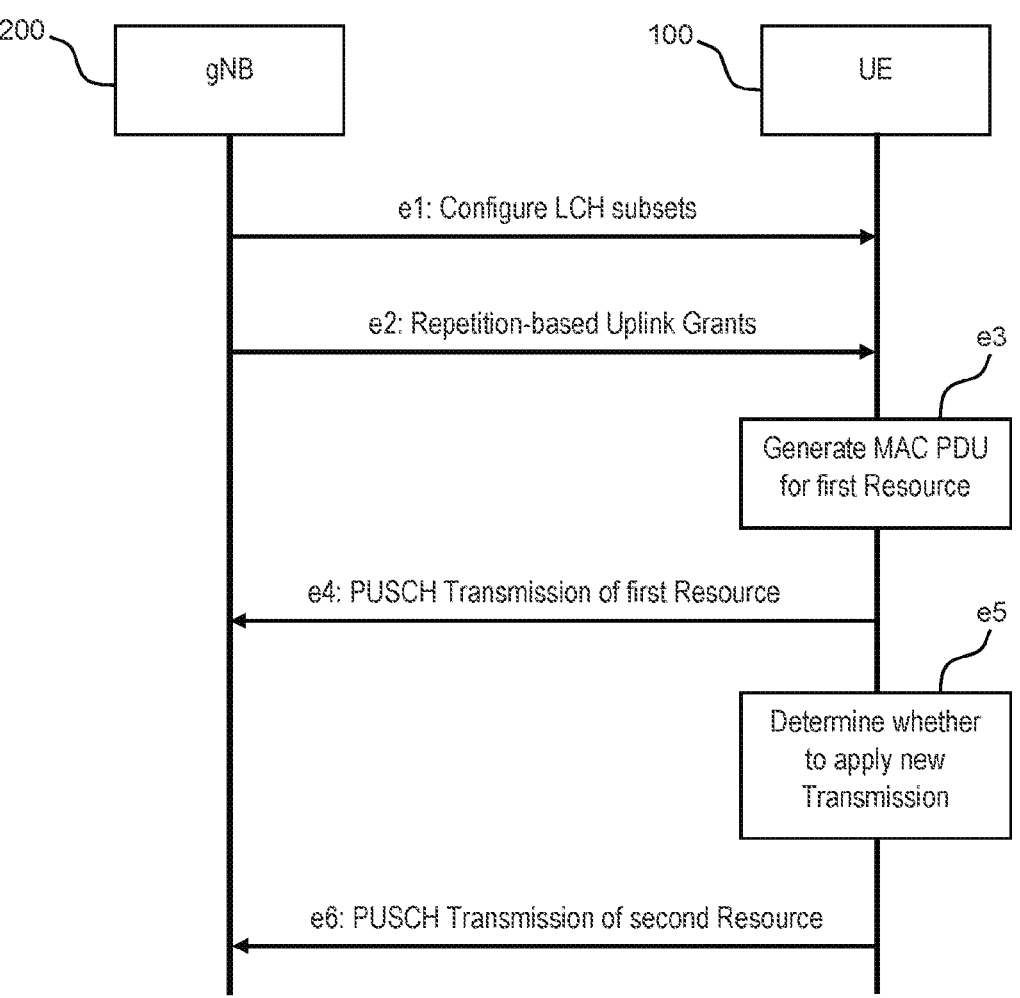

FIG. 18 schematically depicts a simplified signaling chart according to some embodiments.

Element e1 represents a configuration of subsets of LCHs for which repetition transmission should or should not be provided, e.g. via RRC Configuration. Element e2 represents uplink grants with repetition-based PUSCH with a bundle of resources, also cf. FIG. 16, RES-0, RES-1, RES-2, RES-3. According to element e3, the UE 100 generates a first MAC PDU PDU1 for the first resource RES-0. Element e4 represents a PUSCH transmission of the first resource RES-0, carrying the first data packet PDU1. Element e5 represents a determination of the UE 100 whether to apply a new transmission, e.g. similar to step 322 of FIG. 5, and element e6 represents a PUSCH transmission of the further resources related to the new transmission. According to some embodiments, element e6 may also comprise an indication IND of HARQ process switching and/or notifying the gNB 200 how the radio resource of the repetition-based uplink grant has been used by the UE 100.

According to some embodiments, repetition-based PUSCH may be used for URLLC data, and the number of repetitions may be configured via e.g. "PUSCH-Config" with RRC signaling. It ensures that certain reliability can be achieved by repeated transmission, while reducing latency by exempting from waiting for re-transmission resources.

On the other hand, for other traffics such as eMBB that do not have strict requirement on reliability and latency, blindly repeating the transmission with the pre-configured resource for example actually may lead to inefficient use of radio resources.

According to some embodiments, it is anticipated that many UEs in various verticals would need to handle co-existence of at least eMBB and URLLC traffics. Hence, may be possible that a UE would transmit eMBB data using repetition-based PUSCH resource when there is no URLLC data queueing in the buffer. According to some embodiments, one could argue that, with LCH mapping restriction one could allow URLLC traffic but no other traffics to use certain grants (such as CGs with repetitions); this is true but such restriction also may result in inefficient resource utilization, as it means the UE may have to skip some available radio resources which are exclusively for URLLC traffic even it has some eMBB data waiting to be transmitted.

Therefore, in practice, it may be unlikely that a UE would be configured to be restricted from using certain radio resources for non-URLLC traffics, as URLLC traffics will be prioritized in using these resources when they arrive in the buffer anyway.

At least some of the above-explained embodiments may contribute to at least sometimes improve the radio resource efficiency of repetition-based PUSCH based on the criterion CRIT, e.g. related to a type of data to be transmitted.

Even though some embodiments have been described above with reference to examples according to the accompanying drawings, it is clear that the embodiments are not restricted thereto but can be modified in several ways within the scope of the appended claims. Therefore, all words and expressions should be interpreted broadly and they are intended to illustrate, not to restrict, the embodiments. It will be obvious to a person skilled in the art that, as technology advances, the concept according to the embodiments can be implemented in various ways. Further, it is clear to a person skilled in the art that the described embodiments may, but are not required to, be combined with other embodiments in various ways.

The invention claimed is:

1. A user equipment, UE, comprising:

at least one processor; and at least one memory storing instructions that, when executed by the at least one processor, cause the UE at least to:

provide a first data packet (MAC PDU) for transmission on a first resource (RES-0) of a repetition-based uplink grant (RB-UG); and determine how to use resources of the repetition-based uplink grant (RB-UG), including determining whether to repeat transmission of the first data packet or to generate at least one new data packet for transmission on at least one subsequent resource of the repetition-based uplink grant (RB-UG), wherein the determining is performed autonomously by the UE without requiring a new uplink grant or repetition instruction from a base station, based on at least one criterion (CRIT) selected from a group consisting of:

a) a logical channel (LCH) mapped to the data packet or a preconfigured subset of LCHs;

b) presence or type of medium access control (MAC) control elements (CE) mapped to the data packet and the LCHs the MAC CEs relate to;

c) presence of signaling radio bearer (SRB) service data units (SDUs);

d) quality of service (QoS) parameters including at least one of a QoS Flow Identifier (QFI), Packet Delay Budget (PDB), or survival time;

e) availability of higher-priority data compared to the data packet;

f) availability of data from a certain LCH or a certain MAC CE;

g) a MAC entity; and h) a configured grant (CG) configuration; and when generating the at least one new data packet, use a subset of the resources of the repetition-based uplink grant (RB-UG) for the new transmission, the subset being indicated by a configuration message or implicitly by a redundancy version (RV) configuration.

2. The UE according to claim 1, wherein the instructions, when executed by the at least one processor, further cause the UE to: provide a first data packet (PDU1) for a first resource (RES-0) of the repetition-based uplink grant (RB-UG), and to determine how to use further resources (RES-1, RES-2, RES-3) of the repetition-based uplink grant (RB-UG) based on a criterion (CRIT) related to the first data packet (PDU1).

3. The UE according to claim 1, wherein the instructions, when executed by the at least one processor, further cause the UE to: check the at least one data packet (PDU1) for the criterion (CRIT), and to determine, based on the check, whether to repeat a transmission of the at least one data packet (PDU1) or to generate a new transmission of at least one new data packet.

4. The UE according to claim 3, wherein the instructions, when executed by the at least one processor, further cause the UE to: use a subset (SS-RES) of the resources (RES-0, RES-1, RES-2, RES-3) of the repetition-based uplink grant (RB-UG) for the new transmission.

5. The UE according to claim 4, wherein the instructions, when executed by the at least one processor, further cause the UE to: determine the subset (SS-RES) based on both: a) a configuration message (CM1), and b) a redundancy version configuration (RV-CFG) of a repetition.

6. The UE according to claim 1, wherein the criterion (CRIT) comprises at least three of: a) at least one logical channel, LCH, from a preconfigured LCH subset mapped to the at least one data packet (PDU1), b) medium access control, MAC, control elements, CE, mapped to the at least one data packet (PDU1), b1) a type of MAC CEs mapped to the at least one data packet (PDU1), b2) LCHs the MAC CEs mapped to the at least one data packet (PDU1) are relating to, c) a presence of MAC service data units, SDUs, from a Signaling Radio Bearer, SRB, in the at least one data packet (PDU1), d) quality of service, QoS, parameters relating to data conveyed in the at least one data packet (PDU1), e) availability of relatively higher priority data as compared to the at least one data packet (PDU1), f) availability of data from certain LCH or MAC CE, g) MAC entity, and h) configured grant, CG, configuration.

7. The UE according to claim 1, wherein the instructions, when executed by the at least one processor, further cause the UE to: receive a configuration message (CM2) indicating: a) whether to apply repeated transmissions to data associated with different levels of QoS, and b) subsets of LCHs where repeated transmissions should be applied.

8. The UE according to claim 1, wherein the instructions, when executed by the at least one processor, further cause the UE to: transmit an indication (IND) indicating how a radio resource of the repetition-based uplink grant (RB-UG) has been used by the UE.

9. The UE according to claim 8, wherein the indication (IND) indicating how a radio resource of the repetition-based uplink grant has been used by the UE is explicitly multiplexed into the physical uplink shared channel (PUSCH) as uplink control information (UCI) or implicitly indicated using different demodulation reference signal (DMRS) sequences, patterns, mappings, or orthogonal cover codes (OCC).

10. The UE according to claim 1, wherein the criterion (CRIT) further comprises a timer value or survival time associated with a logical channel (LCH), the timer value defining a time window during which repeated transmissions are applied to data from the LCH.

11. The UE according to claim 1, wherein the instructions, when executed by the at least one processor, further cause the UE to indicate a hybrid automatic repeat request (HARQ) process identifier (PID) corresponding to a new transmission initiated within the repetition-based uplink grant.

12. A base station, comprising:
at least one processor, and
at least one memory storing instructions that, when executed by the at least one processor, cause the base station at least to:
transmit a first configuration message (CM1) indicating a subset (SS-RES) of resources (RES-0, RES-1, RES-2, RES-3) of a repetition-based uplink grant (RB-UG) a user equipment, UE, may use for a new transmission; and
configure the UE with at least one criterion (CRIT) based on which the UE autonomously determines how to use resources of the repetition-based uplink grant (RB-UG) without requiring a new uplink grant or repetition instruction from the base station, the at least one criterion (CRIT) being selected from a group consisting of:
a) a logical channel (LCH) mapped to a data packet or a preconfigured subset of LCHs;
b) presence or type of medium access control (MAC) control elements (CE) mapped to the data packet and the LCHs the MAC CEs relate to;
c) presence of signaling radio bearer (SRB) service data units (SDUs);
d) quality of service (QoS) parameters including at least one of a QoS Flow Identifier (QFI), Packet Delay Budget (PDB), or survival time;
e) availability of higher-priority data compared to the data packet;
f) availability of data from a certain LCH or a certain MAC CE;
g) a MAC entity; and
h) a configured grant (CG) configuration.

13. The base station according to claim 12, wherein the instructions, when executed by the at least one processor, further cause the base station to transmit a second configuration message (CM2) indicating: a) whether to apply repeated transmissions to data associated with different levels of QoS, and b) subsets of LCHs where repeated transmissions should be applied.

14. The base station according to claim 12, wherein the instructions, when executed by the at least one processor, further cause the base station to configure the UE with a criterion (CRIT) based on which the UE may determine how to use the resources of the repetition-based uplink grant (RB-UG).

15. The base station according to claim 12, wherein the instructions, when executed by the at least one processor, further cause the base station to configure the UE based on: a) per-MAC entity basis, b) per-Configured Grant basis, and c) per-LCH basis.

16. The base station according to claim 12, wherein the instructions, when executed by the at least one processor, further cause the base station to use at least one of Layer-1, L1, signaling or Layer-2, L-2, signaling, or Layer-3, L-3 signaling for: a) transmitting the first configuration message (CM1), b) transmitting the second configuration message (CM2), and c) configuring the UE.

17. A method, comprising:
providing a first data packet (MAC PDU) for transmission on a first resource (RES-0) of a repetition-based uplink grant (RB-UG); and
determining how to use resources of the repetition-based uplink grant (RB-UG), including determining whether to repeat transmission of the first data packet or to generate at least one new data packet for transmission on at least one subsequent resource of the repetition-based uplink grant (RB-UG), wherein the determining is performed autonomously by the UE without requiring a new uplink grant or repetition instruction from a base station, based on at least one criterion (CRIT) selected from a group consisting of:

a) a logical channel (LCH) mapped to the data packet or a preconfigured subset of LCHs;

b) presence or type of medium access control (MAC) control elements (CE) mapped to the data packet and the LCHs the MAC CEs relate to;

c) presence of signaling radio bearer (SRB) service data units (SDUs);

d) quality of service (QoS) parameters including at least one of a QoS Flow Identifier (QFI), Packet Delay Budget (PDB), or survival time;

e) availability of higher-priority data compared to the data packet;

f) availability of data from a certain LCH or a certain MAC CE;

g) a MAC entity; and h) a configured grant (CG) configuration.

18. A non-transitory computer-readable medium comprising computer-readable instructions encoded thereon, said instructions, when executed by a processor, cause the processor to perform the method of claim 17.

19. A method, comprising:

transmitting a first configuration message (CM1) indicating a subset (SS-RES) of resources (RES-0, RES-1, RES-2, RES-3) of a repetition-based uplink grant (RB-UG) a user equipment, UE, may use for a new transmission; and configuring the UE with at least one criterion (CRIT) based on which the UE autonomously determines how to use resources of the repetition-based uplink grant (RB-UG) without requiring a new uplink grant or repetition instruction from the base station, the at least one criterion (CRIT) being selected from a group consisting of:

a) a logical channel (LCH) mapped to a data packet or a preconfigured subset of LCHs;

b) presence or type of medium access control (MAC) control elements (CE) mapped to the data packet and the LCHs the MAC CEs relate to;

c) presence of signaling radio bearer (SRB) service data units (SDUs);

d) quality of service (QoS) parameters including at least one of a QoS Flow Identifier (QFI), Packet Delay Budget (PDB), or survival time;

e) availability of higher-priority data compared to the data packet;

f) availability of data from a certain LCH or a certain MAC CE;

g) a MAC entity; and h) a configured grant (CG) configuration.

20. A non-transitory computer-readable medium comprising computer-readable instructions encoded thereon, said instructions, when executed by a processor, cause the processor to perform the method of claim 19.

* * * * *